Nov. 23, 1926.
A. A. EWALD
FAUCET
Filed Nov. 9, 1925
1,608,379
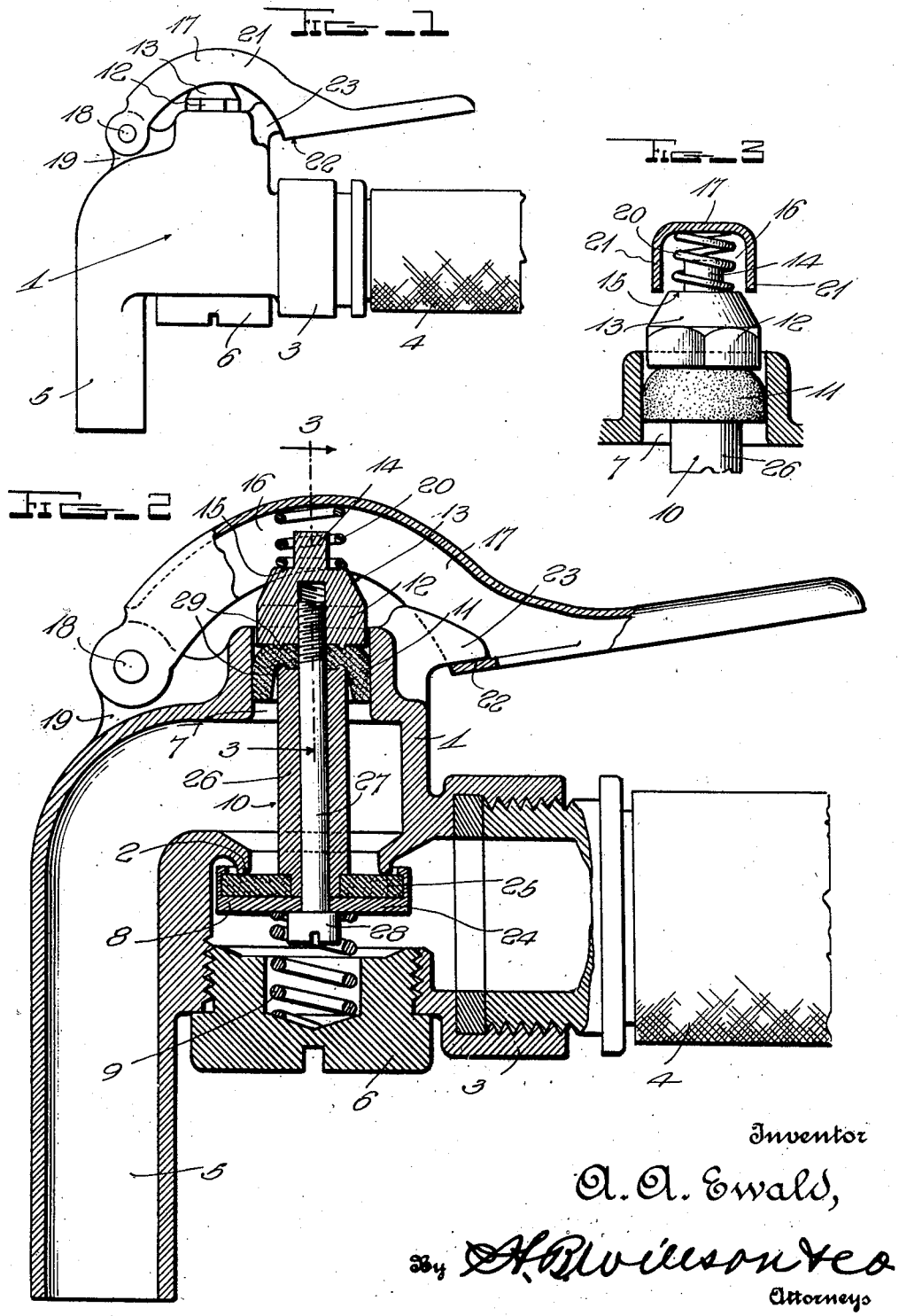
Inventor
A. A. Ewald,
By H. B. Willson & Co.
Attorneys Patented Nov. 23, 1926.

1,608,379

UNITED STATES PATENT OFFICE.

ARNO A. EWALD, OF OAKFIELD, WISCONSIN, ASSIGNOR TO ROMORT MANUFACTURING CO., OF OAKFIELD, WISCONSIN.

FAUCET.

Application filed November 9, 1925. Serial No. 67,900.

The invention relates to improvements in faucets of a type designed primarily for use at the end of a water hose, for the purpose of filling the radiators of automobiles, although the device is by no means restricted to this particular field.

The device comprises a self-closing valve within the body of the faucet and having an operating stem extending to the exterior of said body, together with a hand lever fulcrumed upon the body for manipulating the stem to open the valve, one object being to provide limiting means for the outward movement of the lever, and spring means for separating the lever from the valve stem and engaging said lever with said limiting means, so that said limiting means cannot cause the lever to obstruct the valve closing movement of the stem.

In carrying out the above end, further objects are to confine the above-mentioned spring means in a channel of the operating lever and to operatively relate said means with the valve stem; to make provision whereby the side flanges or walls of the lever channel co-operate with a tapered head on the stem in effecting opening of the valve; to provide unique stop means for limiting the outward movement of the lever away from the body; and to provide a construction which may be easily and inexpensively manufactured and marketed, yet will be efficient, reliable and desirable from all angles.

The invention resides in the novel subject matter hereinafter described, for attaining the objects in view, such subject matter being fully illustrated in the accompanying drawing.

Figure 1 is a side elevation.

Figure 2 is a longitudinal sectional view.

Figure 3 is a detail transverse section as indicated by line 3—3 of Fig. 2, parts being in elevation.

The form of construction selected for illustration in the present application, may be considered as the preferred form of the invention, with the understanding at the outset, however, that within the scope of such invention as claimed, numerous variations may be made.

The numeral 1 designates a body having an internal valve seat 2, an inlet 3 for connection to a hose or the like 4, and an outlet neck 5. The seat 2 is of course positioned between the inlet 3 and the outlet neck 5, and a portion of the body in line with this seat, is formed by a removable threaded plug 6, the latter being disposed at one side of said seat, while at the other side of the latter, the body is formed with a cylindrical-walled opening 7.

A self-closing valve 8 is positioned between the plug 6 and the seat 2, closing of said valve being preferably effected by a coiled compression spring 9. This valve is provided with a composite stem 10 whose detail construction will be hereinafter described, said stem including a cup-washer 11 which snugly engages the wall of the opening 7, said stem being also provided with a nut 12 which secures the washer 11 in place. This nut is formed with a tapered peripheral portion 13 and with a stud 14 projecting outwardly, a shoulder 15 being formed at the inner end of said stud. The reduced outer end of the nut or head 12 extends into the channel 16 of a longitudinally channeled hand lever 17 which extends transversely of the stem 10, at the exterior of the body 1, said lever being fulcrumed at 18 to a lug 19 formed on said body. A coiled compression spring 20, of less strength than the spring 9, surrounds the stud 14, contacts with the shoulder 15, engages the lever, and is confined within the channel 16. This spring serves to normally swing said lever outwardly from the body, to such an extent as to separate the edges of its side flanges or walls 21 from the tapered surface 13 of the head or nut 12, and to limit the outward swinging of the lever under the influence of such spring, I provide stop means which preferably comprises a web 22 spanning the channel 16, and a stop lug 23 projecting from the body 1 into the channel to co-operate with said web.

By providing the spring means 20, weak with regard to the spring 9, to shift the lever 17 outwardly to the extent permitted by the stops and to separate the flanges or walls 21 from the surface 13, the lever and stops are prevented from interfering with proper closing of the valve under the influence of said spring 9. Moreover, the lever 17 is held against loose movement prior to use, and it may gain a certain amount of momentum when it is forced toward the body 1 to open the valve, before the thrust portions 21 engage the thrust portion 13 of the stem 10, so that easy opening of the valve may be effected. Because the spring 20 is confined in the channel 16 of the lever 17, it cannot become lost or injured, and by so arranging the walls or flanges 21 as to engage the tapered surface 13, exceptionally smooth and easy operation is insured.

The valve and valve stem, in addition to including certain features above described, preferably embody the following details. A flanged metal disk 24 and a packing disk 25 of leather or any desired composition, jointly form the valve proper, and a sleeve 26 which is shouldered to engage the disk 25, to prevent the latter from buckling, constitutes a portion of the stem 10. Through this sleeve, a bolt 27 passes, said bolt having a head 28 abutting the disk 24. This bolt passes through the cup-washer 11 and the nut 12 is threaded on said bolt to clamp said washer tightly against the sleeve 26, said sleeve and nut being preferably ribbed as at 29, to tightly hold the washer in place.

When the plug 6 is removed, the valve 8 and the stem 10 may be withdrawn as a single unit for making any necessary repairs. The construction shown is also of similar advantage when initially assembling the valve at the factory. Moreover, the opening 7, the opening for the plug 6, and the opening within the seat 2, are all in axial alinement with each other, insuring that quick and easy machining may be accomplished. After the valve and the stem are inserted and the spring 9 and plug 6 are properly positioned, or before these operations are performed, the lever 17 may be connected with the body by hooking its web 22 under the stop 23 and then inserting the fulcrum rivet or the like 18.

Attention is directed to the fact that if space did not normally exist between the lever 17 and the stem 10, the restricted outward swinging of said lever would similarly restrict the outward movement of the stem and would interfere with tight closing of the valve 8, should the disk 25 be a trifle thin when initially installed, or if such disk should have worn thin by continual use. Even though the lever 15 is limited in its outward movement, space normally exists between the thrust portions 21 and 13 as clearly shown in Fig. 3, so that complete valve-closing movement of the stem 10 is permitted at all times.

The device is exceptionally simple and inexpensive, yet it will be efficient and reliable, and will produce excellent results. On account of these advantages, the details disclosed are preferably followed. However, within the scope of the invention as claimed, modifications may be made, as hereinbefore set forth.

I claim:

1. A valve comprising a body, a valve therein having a stem extending to the exterior of said body, a closing spring for said valve, a hand lever fulcrumed at the exterior of the body and extending transversely of the stem, said lever and stem having co-acting thrust portions for opening the valve, means for limiting the outward swinging of said lever, and a spring interposed between said stem and lever and of less strength than said valve-closing spring, the second-named spring being adapted to normally swing said lever from the body to separate said thrust portions, such separation and the relative weakness of the second-named spring allowing tight seating of the valve under the influence of the valve-closing spring unhampered by said lever.

2. A valve comprising a body, a self-closing valve therein having a stem whose outer end projects from the body, a longitudinally channeled hand lever fulcrumed at the exterior of the body and extending transversely of the stem, the projecting end of said stem being received in the lever channel, a coiled compression spring confined in the lever channel and interposed between the stem and the lever, said lever and stem having co-acting thrust portions normally separated by said spring, and means for limiting the outward swinging of said lever.

3. A valve comprising a body, a self-closing valve therein having a stem whose outer end projects from the body, a longitudinally channeled hand lever fulcrumed at the exterior of the body and extending transversely of the stem, the projecting end of said stem having a tapered head whose smaller end is disposed outwardly and received in the lever channel, whereby the side flanges or walls of said channel may strike the tapered periphery of said head to force inwardly on the stem and valve, a coiled compression spring confined in the lever channel and interposed between said head and the lever to normally separate the aforesaid flanges or walls from the tapered periphery of the head, and means for limiting the outward movement of said lever.

4. A structure as specified in claim 2; said means for limiting the outward swinging of the lever comprising a stop across the lever channel and a co-acting stop projecting from the body into the lever channel.

5. A valve comprising a body having a cylindrical-walled opening from its interior to its exterior, a valve in the body having a stem provided with a cup-washer in said opening and a nut securing said washer in place, said nut projecting outwardly from said opening and a hand lever fulcrumed on the body and co-operable with said nut to shift the stem in valve-opening direction.

6. In a valve, a body having a cylindrical-walled opening from its interior to its exterior, said body being provided with a valve seat axially alined with and facing away from said opening; a flexible disk for engagement with said seat, a metal backing disk for said flexible disk, said flexible and backing disks having central relatively large and small openings respectively, a bolt passing through said openings and into the central part of said cylindrical-walled opening, said bolt having a head abutting said backing disk, a sleeve surrounding said bolt and bearing against said flexible disk, said sleeve having a reduced inner end passing through the opening of said flexible disk and bearing against said backing disk, the outer end of said sleeve being disposed within said cylindrical-walled opening, a cup washer on the aforesaid bolt engaging the wall of the last named opening and abutting said outer end of the sleeve, a nut threaded on the outer end of the bolt and clamping the cup washer, sleeve and disks on said bolt, and a hand lever fulcrumed to the body and co-acting with the aforesaid nut to inwardly force thereon to open the valve.

In testimony whereof I have hereunto affixed my signature.

ARNO A. EWALD.